United States Patent Office 3,040,031
Patented June 19, 1962

3,040,031
N-HETEROCYCLIC COMPOUNDS
Henri Dietrich, Birsfelden, near Basel, Switzerland, assignor to Geigy Chemical Corporation, Ardsley, N.Y., a corporation of Delaware
No Drawing. Filed July 22, 1960, Ser. No. 44,566
Claims priority, application Switzerland July 23, 1959
7 Claims. (Cl. 260—239)

The present invention concerns new N-heterocyclic compounds having valuable pharmacological properties.

Up to now, 3-acyl-10,11-dihydro-5H-dibenzo[b,f]azepines substituted in the 5-position by a basic radical have not been known. It has now been found that such compounds of the general formula

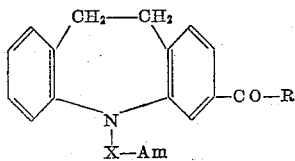

wherein

Am represents lower monoalkylamino, lower dialkylamino, lower monoalkenylamino, lower dialkenylamino, pyrrolidinyl-1, 1-lower alkyl-piperdinyl, piperidino, morpholino, hexamethyleneimino, piperazinyl-1, 4-lower alkylpiperazinyl-1, 4-lower hydroxyalkyl-piperazinyl-1 or 4-(lower alkanoyloxy-lower alkyl)-piperazinyl-1, R represents lower alkyl and X represents alkylene having at least two and at most six carbon atoms, and their salts with inorganic or organic acids, have valuable pharmacological properties, in particular antiallergic, serotoninantagonistic, spasmolytic, sympathicolytic, adrenolytic, sedative and anti-emitic activity. The new compounds can be used as potentiators of other medicaments, in particular of anaesthetics, and they can be used therapeutically, enterally and parenterally, as sedatives and for the treatment of mental disorders.

The compounds defined above are produced by reacting 3-acyl-10,11-dihydro-5H-dibenzo[b,f]azepines of the general formula

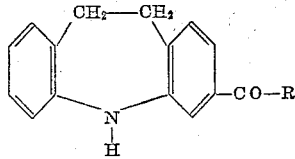

wherein R has the meaning given above, or functional derivatives with regard to the oxo group derived therefrom, in the presence of alkaline condensing agents or after conversion into their alkali metal compounds, with reactive esters of alcohols of the general formula

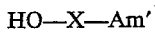
HO—X—Am'     III wherein

X has the meaning given above and

Am' represents lower dialkylamino, lower dialkenylamino, pyrrolidinyl-1, 1-lower alkyl-piperidinyl, piperidino, morpholino, hexamethyleneimino, 4-lower alkyl-piperazinyl-1, 4-lower hydroxyalkyl-piperazinyl-1 or 4-(lower alkanoyloxy-lower alkyl)-piperazinyl-1, and hydrolysing the reaction products, if necessary, in order to liberate the oxo group and then, if desired, converting the compounds of the general Formula I into their salts with inorganic or organic acids.

The starting materials of the general Formula II are obtained in their turn, for example, by condensing 5-acetyl-10,11-dihydro-5H-dibenzo[b,f]azepine with lower alkanoic acid anhydrides in particular acetanhydride, or with lower alkanoyl chlorides by means of aluminium chloride or other appropriate Lewis acids, and then removing the 5-acetyl group by hydrolysis. Examples of compounds of the general Formula II are 3-acetyl-, 3-propionyl-, 3-butyryl-, 3-isobutyryl-, 3-valeryl- and 3-isovaleryl-10,11-dihydro-5H-dibenzo[b,f]azepine, which compounds will be termed in the following as 3-alkanoyl iminodibenzyls.

Functional derivatives of compounds of the general Formula II suitable as starting materials are in particular cyclic ketals such as 3-(α,α-ethylenedioxyalkyl)-10,11-dihydro-5H-dibenzo[b,f]azepines and ketimines such as 3-(α - phenyliminoalkyl)-10,11-dihydro - 5H - dibenzo[b,f] azepines.

In particular the halides and also the sulphonic acid esters, particularly the aryl sulphonates, are used ar reactive esters of alcohols of the general Formula III; individually can be mentioned: dimethylaminoethyl chloride, dimethylaminoethyl-p-toluene sulphonate, diethylaminoethyl chloride, methylethylaminoethyl chloride, β-dimethylaminopropyl chloride, β-dimethylaminoisopropyl chloride, γ-dimethylaminopropyl chloride, γ-dimethylaminopropyl-p-toluene sulphonate, δ-dimethylaminobutyl chloride, α-methyl-γ-dimethylamino-n-amyl chloride, β-(di-n-propylamino)-ethyl chloride, β-(methylisopropylamino)-ethyl chloride, β-(di-n-butylamino)-ethyl chloride, β-(di-isobutylamino)-ethyl chloride, γ-(N-formyl-methylamino)-propyl chloride, γ-(N-methyl-allylamino)-propyl chloride, γ-diallylamino-propyl chloride, β-pyrrolidinyl-1-ethyl chloride, β-piperidino ethyl chloride, γ-piperidino propyl chloride, β-morpholino ethyl chloride, γ-(4-methyl piperazinyl-1)-propyl chloride, β-(4-acetoxyethyl piperazinyl-1)-ethyl chloride, γ-(4-formyl piperazinyl-1)-propyl chloride, γ-(4-acetoxyethyl piperazinyl-1)-propyl chloride and 1-methyl piperidyl-3-methyl chloride as well as the corresponding bromides and iodides.

In the reaction of compounds of the general Formula II with reactive esters of alcohols of the general Formula III, suitable condensing agents are, in particular, sodium amide, lithium amide, potassium amide, sodium, potassium, butyl-lithium, phenyl lithium or lithium hydride. The reaction is performed preferably at elevated temperatures and in the presence or absence of an inert organic solvent of which examples are benzene, toluene, xylenes and dioxan.

In addition, the new compounds of the general Formula I are also produced by reacting reactive esters of hydroxyl compounds of the general formula

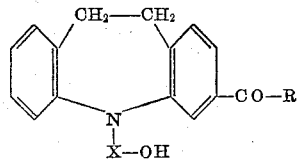
   IV wherein R and X have the meanings given above, or their functional derivatives with regard to the oxo group with amines of the general formula H—Am     V wherein Am has the meaning given above, and then, if necessary, hydrolysing the functional derivatives with regard to the oxo group. The reaction can be performed, for example, at a moderately raised temperature of, e.g. 80–120° C. in an inert solvent such as, for example, a low alkanol or alkanone; advantageously an excess of the amine being reacted is used as acid binding agent. Depending on the boiling point of the amine and of the solvent used and also on the temperature required for the reaction, it may be necessary to operate in a closed system. Ractive esters of compounds of the general Formula IV or their functional derivatives with regard to the oxo group are obtained, for example, by reacting alkali metal compounds of functional derivatives of compounds of the general Formula II with alkylene oxides and reacting the N-hydroxyalkyl derivatives obtained with inorganic acid halides, methane sulphonyl chloride or with aryl sulphonyl halides to form halides, methane sulphonates or aryl sulphonates of compounds of the general Formula IV or of functional derivatives thereof with regard to the oxo group. These can be reacted, for example, with methylamine, ethylamine, n- or iso-propylamine, butylamine, dimethylamine, methylethylamine, diethylamine, di-n-butylamine, allylamine, β-methallylamine, diallylamine, pyrrolidine, piperidine, morpholine, piperazine, 4-methyl-piperazine, 4-hydroxyethyl-piperazine or 4-acetoxyethyl-piperazine.

The compounds of the general Formula I form compatible salts, some of which are water soluble, with inorganic or organic acids such as hydrochloric acid, hydrobromic acid, sulphuric acid, phosphoric acid, methane sulphonic acid, ethane disulphonic acid, acetic acid, citric acid, malic acid, succinic acid, fumaric acid, maleic acid, tartaric acid, benzoic acid and phthalic acid.

Of particular value are compounds of the general Formula I wherein R represent methyl, X represents ethylene, propylene or β-methylpropylene and Am represents dimethylamino, piperidino, 1-methyl-piperidyl-(2), hexamethyleneimino, 4-(β-hydroxyethyl)-piperazinyl-1, 4-(β-acetyloxyethyl)-piperazinyl-1, or 4-methyl-piperazinyl-1.

The following examples illustrate the production of the new compounds. Parts are given therein as parts by weight and their relationship to parts by volume is as that of grammes to cubic centimetres. The temperatures are in degrees centigrade.

*Example 1*

(a) 119 parts of 5-acetyl-iminodibenzyl (m. 95–96°) and 150 parts of acetyl chloride, dissolved in 300 parts by volume of carbon disulphide are added dropwise while stirring to a mixture of 300 parts of aluminium chloride and 600 parts by volume of carbon disulphide. The reaction mixture is stirred for 1 hour at room temperature and then is refluxed while stirring for 16 hours. It is then cooled, and the carbon disulphide which floats on top is poured off. The remaining contents of the flask are poured carefully while stirring onto a mixture of 600 parts of ice and 12 parts by volume of concentrated hydrochloric acid. The crystals which precipitate are filtered off under suction, washed thoroughly with water, dried and recrystallised. The 3,5-diacetyl-iminodibenzyl obtained in this way melts at 143–144°.

(b) 27.9 parts of 3,5-diacetyl-iminodibenzyl in alcoholic potassium lye (28 parts of KOH in 300 parts by volume of alcohol) are saponified by refluxing for about 6 hours. The solution is concentrated and ice is added whereupon the yellow crude product crystallises. The crystals are washed with water and, to purify, recrystallised from a little alcohol. The pure, yellow 3-acetyl-iminodibenzyl melts at 157°; the dark red dinitrophenyl hydrazone thereof melts at 240°.

(c) 23.7 parts of 3-acetyl-iminodibenzyl are dissolved in 250 parts by volume of anhydrous xylene and 0.05 part of p-toluene sulphonic acid and 20 parts by volume of ethylene glycol are added. The mixture is refluxed in a water separator, the mixture of water and ethylene glycol separated being continually replaced by the same volume of ethylene glycol. After about 70 hours, the catalyst is removed by shaking out with 2 N-caustic soda lye and the xylene solution, which has been washed neutral, is dried with sodium sulphate and then concentrated. The substance which crystallises out is continually extracted with petroleum ether. On evaporating the petroleum ether extract, the colourless ketal, 3-(α,α-ethylenedioxyethyl)-iminodibenzyl, is obtained in a practiically pure form. If desired, however, it can be further purified by recrystallisation from alcohol. It melts at 134–136°.

(d) 28.1 parts of ketal and 4.3 parts of pulverized sodium amide are stirred in xylene at 90–100° until the development of ammonia is complete. Then γ-dimethylaminopropyl chloride (liberated from 16 parts of the hydrochloride and taken up in xylene) is added and the reaction mixture is refluxed for 20 hours. The base is extracted from the solution obtained with 2 N-hydrochloric acid. To completely decompose the ketal, the hydrochloric acid solution is boiled for a short time. The base is liberated from the solution with 5 N-caustic soda lye and is extracted with ether. After drying with sodium sulphate and evaporating off the ether, a yellow oil remains. On distilling in a high vacuum, the 3-acetyl-5-(γ-dimethylaminopropyl)-iminodibenzyl passes over at 175–176° under 0.01 mm. pressure. The hydrochloride melts at 191°.

Following the procedure given above and using γ-diethylaminopropyl chloride or β-morpholinoethyl chloride instead of γ-dimethylamino-propyl chloride, 3-acetyl-5-γ-diethylaminopropyl-iminodibenzyl and 3-acetyl-5-β-morpholinoethyl-iminodibenzyl are obtained respectively.

*Example 2*

(a) 10 parts of 3-(α,α-ethylenedioxyethyl)-iminodibenzyl are converted into the sodium salt as set forth in Example 1(d), the operation being carried out in toluene. 7.3 parts of γ-bromopropyl chloride in 20 parts by volume of toluene are then added, causing the mixture to attain its boiling point. It is kept under reflux for 14 hours, then cooled. Water is added, the toluene phase is separated and washed with water, dried over sodium sulphate and evaporated to dryness, leaving 12.8 parts of crude 5-(γ-chloropropyl) - 3 - (α,α - ethylenedioxyethyl)-iminodibenzyl.

(b) 12.8 parts of the foregoing chloropropyl compound, 6.5 parts of 1-β-hydroxyethyl piperazine, 5 parts of sodium iodide and 65 parts by volume of 2-butanone are kept under reflux for 16 hours, when the solvent is stripped off. The residue is taken up in 2 N-hydrochloric acid, warmed for a few minutes on the steam bath, cooled, and the mixture is extracted with ether, the ether extract being discarded. The aqueous layer is then rendered alkaline with sodium hydroxide, extracted with ether, the ether phase is washed with water, dried over sodium sulphate and evaporated, furnishing crude 3-acetyl-5-[γ-(4' - β - hydroxyethyl-piperazinyl-1')-propyl]-iminodibenzyl, which is converted to the bis-hemioxalate salt by means of ethereal oxalic acid solution. The oxalate is crystallised from methanol, m. 209–210° (dec.).

*Example 3*

1 part of 3-acetyl-5-[γ-(4'-β-hydroxyethyl-piperazinyl-1')-propyl]-iminodibenzyl, 3 parts by volume of pyridine and 1.5 parts by volume of acetic anhydride are kept at room temperature for 18 hours. The mixture is then evaporated to near dryness, the residue is taken up in 2 N-hydrochloric acid, extracted with ether, the aqueous acid layer is then rendered alkaline with ice cold sodium hydroxide and extracted with ether. The ether extract is washed with water, dried over sodium sulphate and evaporated, giving crude 3-acetyl-5-[γ-(4'-β-acetoxyethyl-piperazinyl-1')-propyl]-iminodibenzyl, which is converted to the bis-hemioxalate, m. 207–209° (dec.).

*Example 4*

6 parts of 5-(γ-chloropropyl) - 3 - (α,α-ethylenedioxyethyl)-iminodibenzyl, 2.6 parts of sodium iodide, 3 parts of 1-β-acetoxyethyl-piperazine and 45 parts by volume of 2-butanone are heated under reflux for 18 hours. The mixture is worked up as described in Example 2(b) to give the base, 3-acetyl-5-[γ-(4'β-acetoxyethyl-piperazinyl-1')-propyl]-iminodibenzyl; oxalate m. 205–208° (dec.).

Example 5

A solution of 3-acetyl-5-[γ-(4'-β-hydroxyethyl-piperazinyl-1')-propyl]-iminodibenzyl (1 part) in pyridine (3 parts) and propionic anhydride (1.2 parts) is warmed to about 60° for 6 hours. The mixture is worked up according to the procedure outlined in Example 3 to give 3-acetyl-5-[γ - (4' - β - propionyloxyethyl - piperazinyl-1') - propyl]-iminodibenzyl.

Example 6

To the sodium salt prepared from 5 parts of 3-(α,α-ethylenedioxypropyl)-iminodibenzyl in toluene according to Example 1(d), are added 3.1 parts of γ-dimethylaminopropyl chloride in 20 parts by volume of toluene and the mixture is refluxed for 14 hours. After cooling, excess 2 N-hydrochloric acid is added, the aqueous phase is separated and briefly warmed on the steam bath, then cooled and alkalised with concentrated ammonia and extracted with ether. The ether extract is washed with water, dried over sodium sulphate and evaporated. The residue is distilled, to give 5-(γ-dimethylaminopropyl)-3-propionyl-iminodibenzyl, B.P.$_{0.05}$ 180–184°.

Example 7

The sodium salt prepared from 7 parts of 3-(α,α-ethylenedioxyethyl)-iminodibenzyl according to Example 1(d) is reacted, in toluene, with 5.7 parts of γ-hexamethylene-imino-β-methylpropyl chloride in 50 parts by volume of toluene, the mixture being refluxed for 12 hours. Water is then added, the toluene phase is separated, extracted with 2 N-hydrochloric acid, the aqueous phase is basified with concentrated ammonia and extracted with ether. The ether phase is washed with water, dried over potassium carbonate and evaporated. The residue is distilled, furnishing 3-acetyl-5-(γ-hexamethyleneimino-β - methylpropyl)-iminodibenzyl, B.P.$_{0.003}$ 211°. This is converted, by means of ethanolic hydrochloric acid, to the hydrochloride, m. 191–193° (from acetone).

Example 8

7 parts of 3-(α,α-ethylenedioxyethyl)-iminodibenzyl in 100 parts by volume of toluene are converted to the sodium salt according to Example 1(d), and then reacted with 6.8 parts of γ-(4-methyl-piperazinyl-1)-propyl chloride in 60 parts by volume of toluene, the mixture being kept under reflux for 14 hours. The product, 3-acetyl - 5 - [γ - (4' - methyl - piperazinyl - 1') - propyl]-iminodibenzyl, is then isolated in a manner entirely analogous to that described in Example 5; B.P.$_{0.0005}$ 205–209°. The bis-hydrochloride melts at 206–210° (from acetone).

Example 9

(a) The sodium salt prepared from 5.5 parts of 3-(α,α-ethylenedioxyethyl)-iminodibenzyl according to Example 1(d) and 4.2 parts of 1-formyl-4-(γ-chloropropyl)-piperazine in 100 parts by volume of toluene are refluxed for 16 hours. Water is added to the cooled mixture, the organic phase is separated and extracted with 2 N-hydrochloric acid. The acidic extract is made basic with ammonia and the product is extracted into ether. The ether extract is washed with water, dried over sodium sulphate and evaporated to give the residual product, 3-acetyl-5 - [γ - (4' - formyl - piperazinyl - 1') - propyl]-iminodibenzyl.

(b) The above product (4 parts), 60 parts by volume of methanol, 40 parts by volume of water and 4 parts of sodium hydroxide are refluxed for 4 hours. The solvents are removed in vacuo, the residue is diluted with water, extracted with benzene, the benzene phase is separated, washed with water, dried over sodium sulphate, evaporated and the residue is distilled to give 3-acetyl-5-[γ-piperazinyl-(1')-propyl]-iminodibenzyl.

Example 10

Crude 5-(γ-chloropropyl)-3-(α,α - ethylenedioxyethyl)-iminodibenzyl (5 parts) prepared according to Example 2(a) is dissolved in concentrated ethanolic methylamine solution (60 parts) and the mixture is heated for 16 hours at 80° in a closed system. Solvent and excess methylamine are then removed, the residue is distributed between 5 N-ammonia and ether, the ether phase is separated and extracted with 2 N-hydrochloric acid, the aqueous acid phase is briefly warmed and then basified, extracted with ether, the ether extract is washed with water, dried over potassium carbonate and evaporated. The residue is distilled to give 3-acetyl-5-(γ-methylaminopropyl)-iminodibenzyl, B$_{0.04}$ 179–183°.

The same compound is obtained if, following the procedure of Example 9(a), 5.6 parts of 3-(α,α-ethylenedioxyethyl)-iminodibenzyl are reacted with 2.7 parts of γ-(N-formylmethylamino)-propyl chloride and the reaction product is hydrolysed analogously to Example 9(b).

Example 11

28.1 parts of ketal (3-(α,α-ethylenedioxyethyl)-iminodibenzyl) produced according to Example 1(a)–(c), and 4.3 parts of pulverised sodium amide are stirred for 3 hours at 80° in 150 parts by volume of xylene. Piperidino-ethyl chloride (liberated from 24 parts of the hydrochloride and taken up in xylene) is then added and the reaction mixture is refluxed for 20 hours. The base is extracted from the cooled solution with 2 N-hydrochloric acid. To completely decompose the ketal, the hydrochloric acid solution is briefly boiled. The base is liberated from the solution with 5 N-caustic soda lye and extracted with ether. After drying with sodium sulphate and evaporating off the ether, 3-acetyl-5-(β-piperidinoethyl)-iminodibenzyl remains as a yellow oil which can be converted into the hydrochloride. Recrystallised from acetone, the hydrochloride melts at 206°.

3-acetyl-5-(1-methyl-piperidyl - (2) - ethyl) - iminodibenzyl is obtained in an analogous manner from 28.1 parts of ketal (3-(α,α-ethylenedioxy-ethyl)-iminodibenzyl), 4.3 parts of sodium amide and 1-methyl-piperidyl-(2)-ethyl chloride (liberated from 23.5 parts of the hydrochloride). It is an oil which boils at 195° under 0.06 mm. pressure.

3-acetyl-5 - (pyrrolidinyl-ethyl) - iminodibenzyl is obtained in an analogous manner.

28.1 parts of ketal, 4.3 parts of sodium amide and morpholino-propyl chloride (liberated from 23 parts of hydrochloride) produce an oil which can be distilled without decomposing in a high vacuum and can be converted into the hydrochloride of 3-acetyl-5-(γ-morpholino-propyl)-iminodibenzyl.

Following the procedure given in Example 1(d) and using dimethylamino-isopropyl chloride instead of γ-dimethylamino-propyl chloride, a mixture of 3-acetyl-5-(β-dimethylamino - β - methyl) - ethyl iminodibenzyl and 3-acetyl-5-(β-dimethylamino-α-methyl) - ethyliminodibenzyl is obtained yielding hydrochlorides with m. 207–208°.

What I claim is:

1. A member selected from the group consisting of an N-heterocyclic compound of the formula

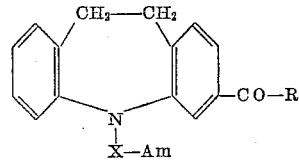

wherein

Am represents a member selected from the group consisting of lower monoalkylamino, lower dialkylamino, lower monoalkenylamino, lower dialkenylamino, pyrrolidinyl-1, 1-lower alkyl-piperidinyl, piperidino, morpholino, hexamethyleneimino, piperazinyl-1, 4-lower alkyl-piperazinyl-1, 4-lower hydroxyalkyl-piperazinyl-1 and 4-(lower alkanoyloxy-lower alkyl)-piperazinyl-1, R represents lower alkyl, and X represents alkylene having at least two and at most six carbon atoms and pharmaceutically acceptable acid addition salts thereof.

2. 3-acetyl-5-(γ-dimethylaminopropyl)-iminodibenzyl.
3. 3-acetyl-5[γ-(4'-β - hydroxyethyl - piperazinyl - 1')-propyl]-iminodibenzyl.
4. 3 - acetyl - 5 - [γ - (4' - methyl-piperazinyl - 1')-propyl]-iminodibenzyl.
5. 3 - acetyl - 5 - [γ - piperazinyl - (1') - propyl]-iminodibenzyl.
6. 3-acetyl-5-(γ-methylaminopropyl)-iminodibenzyl.
7. 3 - acetyl - 5 - (1 - methyl - piperidyl - (2) - ethyl)-iminodibenzyl.

References Cited in the file of this patent
UNITED STATES PATENTS

| | | |
|---|---|---|
| 2,554,736 | Haefliger et al. | May 28, 1951 |
| 2,666,051 | Haefliger et al. | Jan. 12, 1954 |